April 28, 1936. A. W. OGILVY-WEBB 2,039,203
FURNACE APPARATUS FOR THE HEAT TREATMENT OF METALLIC OR OTHER BODIES
Filed Oct. 23, 1933   3 Sheets-Sheet 1
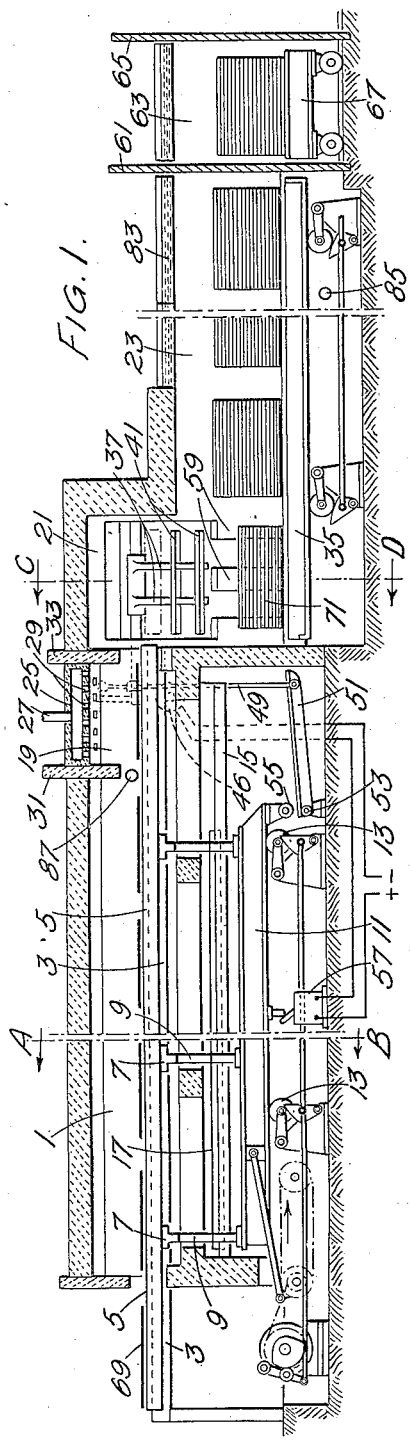

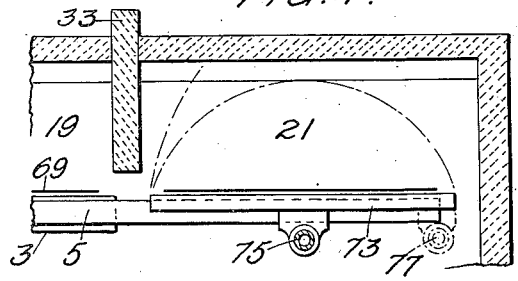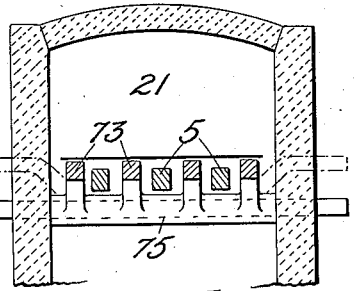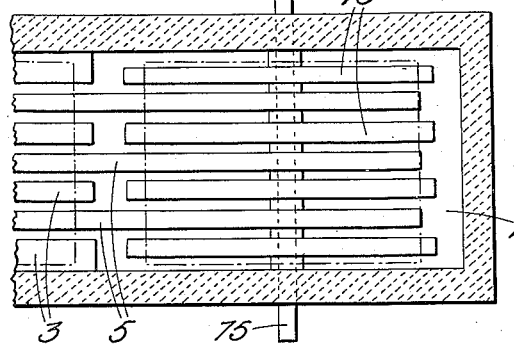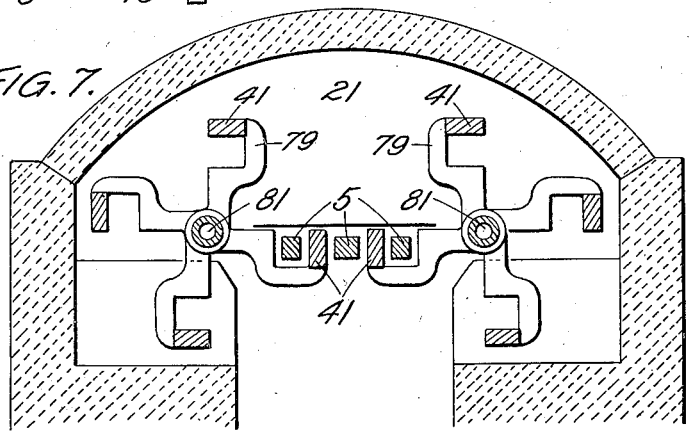

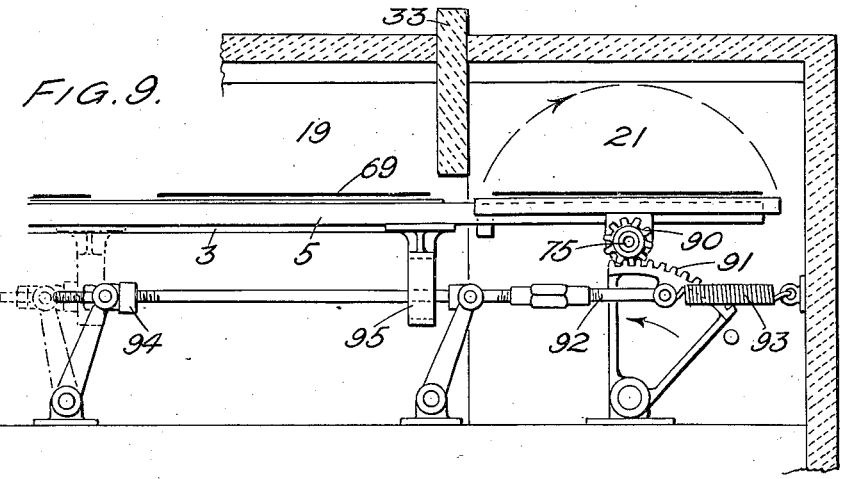
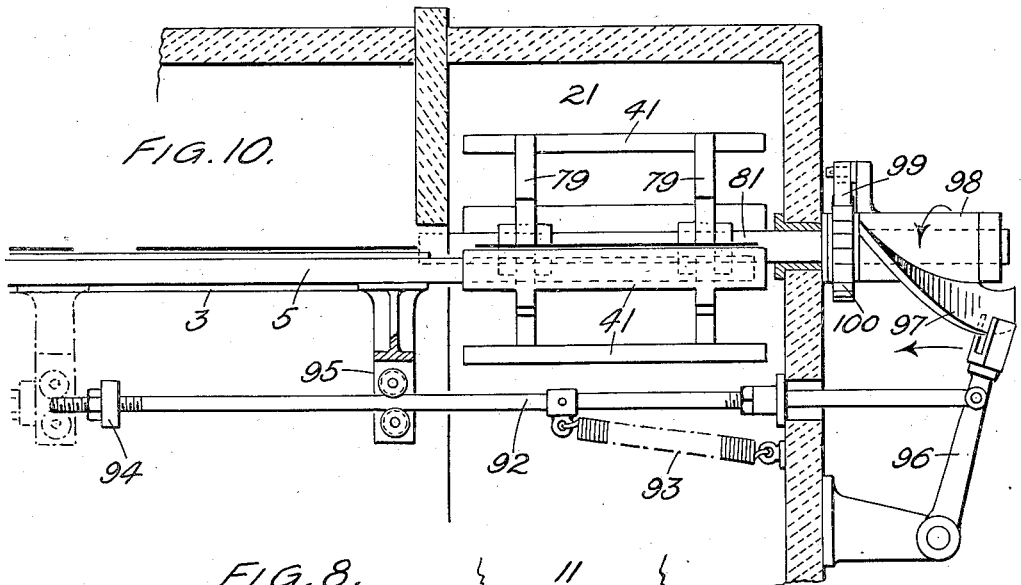
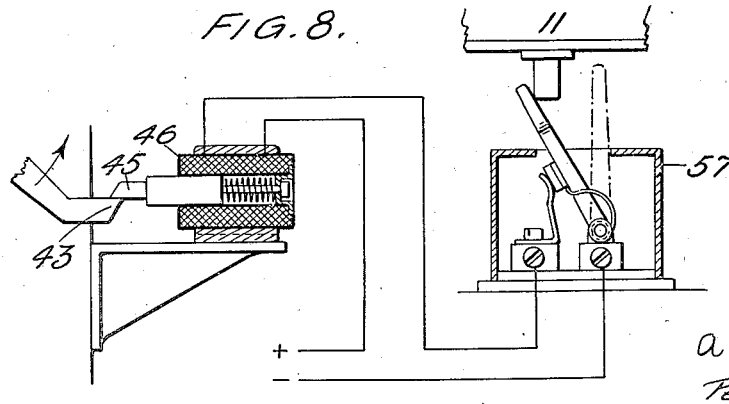

Patented Apr. 28, 1936

2,039,203

UNITED STATES PATENT OFFICE 2,039,203

FURNACE APPARATUS FOR THE HEAT TREATMENT OF METALLIC OR OTHER BODIES

Arthur William Ogilvy-Webb, London, England

Application October 23, 1933, Serial No. 694,876
In Great Britain October 27, 1932

10 Claims. (Cl. 263—6)

This invention relates to furnace apparatus for the heat treatment of metallic or other articles, more particularly that are in flat form, such for example, as steel sheets, tin plates or the like, or trays of small articles. One object of the invention is to provide apparatus whereby the manual handling of such articles heated in a furnace may be reduced.

According to the present invention apparatus for the heat treatment of metallic or other articles in flat form, such for example, as steel sheets, tin plates or the like, or trays of small articles, comprises a furnace having conveyor means to transmit the articles from the charging to the discharge end and means at the discharge end to receive the articles from the conveyor and deliver them to or stack them in a pile.

The means to receive the articles from the conveyor and deliver them to or stack them in a pile may comprise a platform and means to turn over said platform to deliver an article from it.

In a modification of the invention the platform may be divided into two parts each pivoted at its outer edge and means to permit or cause the parts to turn downwards about their pivots to deliver an article from the platform. The parts of the platform may be each constituted by a series of fingers or bars and the fingers or bars of one part extend between those of the other part in the supporting position.

According to a further feature of the invention a furnace for the heat treatment of metallic or other articles comprises a heating chamber, conveyor means therein to transmit the articles therethrough, a receiving chamber at the discharge end, a cooling chamber communicating with the receiving chamber, conveyor means extending through the cooling chamber, and means in the receiving chamber to receive articles from the conveyor in the heating chamber and stack them in a pile on the conveyor means extending through the cooling chamber.

The invention is particularly applicable to a combined normalizing and annealing furnace for thin metal sheets.

The invention also comprises a method of normalizing and annealing a metal article which consists in submitting the article to a normalizing treatment (which may include alternate heating and cooling operations) then transferring it at annealing temperature without further cooling to an annealing chamber and submitting it in said chamber to an annealing treatment which employs the heat provided in the normalizing treatment.

The invention will now be described, by way of example, with particular reference to a combined normalizing and annealing furnace for thin metal sheets. The exemplary forms of the invention are illustrated in the accompanying drawings wherein:—

Fig. 1 shows a sectional elevation of the furnace,
Fig. 2 a section on the line A—B of Fig. 1,
Fig. 3 a section on the line C—D of Fig. 1,
Fig. 4 an enlarged sectional elevation of a modified form of stacking means employed in the receiving chamber,
Fig. 5 a section thereof,
Fig. 6 a plan thereof,
Fig. 7 a section corresponding to Fig. 3 of a modification.
Fig. 8 is a sectional view illustrating the electrical apparatus of the arrangement shown in Figs. 1 to 3,
Fig. 9 is a sectional elevation illustrating the actuating gear of the modification shown in Figs. 4 to 6, and
Fig. 10 is a sectional elevation of the modification shown in Fig. 7, illustrating the actuating gear therefor.

Referring to Figs. 1, 2, and 3 the normalizing chamber is indicated at 1. The first part of the chamber 1 may be a preheating chamber, as well known in the art. A conveyor extends through the furnace; it is shown as of the "walking beam" type comprising a series of fixed bars 3 and a series of movable bars 5 arranged longitudinally in the furnace with the movable bars disposed between the fixed bars and arranged to be moved upward, forward, downward, and rearward in sequence. The movable bars are carried on cross members 7 which in turn are carried on vertical pillars 9 supported on the longitudinally movable carriage 11. The carriage 11 is supported on rollers 13. Driving means of any known form is provided to raise the rollers 13 and thus the carriage 11 to move the bars 5 above the level of the fixed bars 3, then to move the carriage and the bars 5 forward, then to lower the rollers 13 and the carriage 11 to move the bars 5 below the level of the bars 3, and finally to move the carriage and the bars 5 rearward. The pillars 9 pass through slots in the floor of the chamber 1 and to prevent the admission of atmospheric air a liquid seal is provided consisting of a tank 15 fixed under the furnace floor and a dipper cover 17 fixed on the pillars 9 and movable with them. The end of the normalizing chamber communicates with a pre-cooling chamber or zone 19 which in turn communicates with the upper part of a receiving chamber 21 and the lower part of said receiving chamber communicates with the annealing chamber 23. The pre-cooling chamber 19 has a hollow roof 25 to which cold non-oxidizing gases are fed by the pipe 27; said gases may consist of cooled burned gases devoid of oxidizing gases. The roof has a number of apertures 29 arranged to direct the gases on to the articles passed into the chamber 19. The roof and side walls may be water cooled if desired. An adjustable depending division wall 31 is shown between the chambers 1 and 19 and a similar adjustable division wall 33 between the chambers 19 and 21. In some circumstances these walls may be omitted.

Within the receiving chamber 21 is means to receive the sheets from the conveyor which extends through the chamber 19, and stack them in a pile on a conveyor 35 which extends into the lower part of the receiving chamber and through the annealing chamber 23. This conveyor is also of the "walking beam" type and is illustrated diagrammatically. The means to stack the sheets received from the normalizing chamber may be of various forms, examples of which will be described.

The form of stacking means illustrated in Figs. 1 and 3 is of the form of a flap door in two parts. Each casting carries supporting bars 41, preferat its outer edge on a water-cooled shaft 39 which passes through the walls of the chamber 21. Each casting carries suporting bars 41, preferably of heat resisting material, which in the raised position are disposed opposite and constitute an extension of the fixed bars 3 of the conveyor in the normalizing chamber. Each shaft 39 carries at one end an arm 43 which engages an electrically operated detent 45 to hold the parts in the raised position. A second arm 47 on each shaft 39 is attached by a rod 49 to levers 51 pivoted at 53 and engaged by rollers 55 mounted at the end of the carriage 11. 57 (Figs. 1 and 8) is a switch connected in the circuit of the electrically operated detents 45 which is closed by the carriage 11 when it reaches the end of its rearward movement to cause the detents to be withdrawn to permit the parts to fall as is indicated in Fig. 1. The switch reopens on the movement of the carriage in the forward direction. Guides 59 are provided in the chamber 21 to ensure that the sheets are moved along the same path and are stacked symmetrically.

61 is a door closing the connection of the annealing chamber 23 with an anti-chamber 63 which chamber is closed by a door 65. 67 is a truck which is moved into the chamber 63 to receive a stack of sheets from the annealing chamber. The annealing chamber being cooler than the normalizing chamber the moving bars of the conveyor may move directly on rollers the use of pillars being dispensed with.

The operation of the apparatus is as follows. The sheets to be treated indicated at 69 are fed to the conveyor which moves them through the normalizing chamber 1 where they are heated to the requisite temperature for example 920° C. for mild steel. They pass from the normalizing chamber 3 to the pre-cooling chamber 19 where jets of cooled non-oxidizing gases are blown on to them from the apertures 29. They are thus cooled to a suitable annealing temperature which may be 800° C. to 850° C. for sheets of low carbon content. The sheets are then passed into the receiving chamber 21 and are delivered to the supporting bars 41 of the stacking means by the movable bars 5 in their raised position moving forward between the supporting bars 41 of the stacking means. At the end of their forward travel the bars 5 move downward and then rearward, and at the end of their travel in a rearward direction the carriage 11 operates the switch 57 to close the electrical circuit of the electrically operated detents 45 whereby the latter are withdrawn to permit the parts of the stacking apparatus to fall. The sheet is thus delivered on to the conveyor 35 to form a stack 71. The stack is symmetrically formed by means of the guides 59. When the stack 71 contains the requisite number of sheets the conveyor 35 is operated to move the stack into the annealing chamber 23. The door 61 is first opened so that the last stack on the conveyor 35 is at the same time delivered to a waiting truck 67. The movable bars of the conveyor are then returned to their original position ready to receive another stack of plates from the stacking means and the door 61 is then closed, the door 65 opened and the truck 67 removed. As the carriage 11 of the conveyor in the normalizing chamber 1 moves forward, the switch 57 in the circuit of the electrically operated detents 45 opens to permit them to return into the path of the arm 43. As the carriage 11 travels forward the rollers 55 engage the levers 51 and depress them, and as the movable bars move in a downward direction the carriage 11 causes the levers 51 to move and draw the arms 47 downwards and with them the arms 43 to raise the parts and their supporting bars 41 to a position in which they are level with the fixed bars 3 of the conveyor. The detents 45 lock the parts in the raised position to receive another sheet from the conveyor.

The two hinged parts of the stacking means may be caused to operate so quickly that when the sheet carried on it is released from it rubbing on the bars 41 is largely or entirely prevented.

A second form of stacking means is illustrated in Figs. 4, 5, 6, and 10. In this case the stacking means comprises a platform composed of a series of bars 73 constituting in effect an extension of the fixed bars 3 of the conveyor in the normalizing chamber and centrally mounted on a transverse shaft 75. The shaft 75 is operatively connected to the movable part of the conveyor so that when the movable bars 5 have been advanced into the spaces between the bars 73, moved to the lowest position to deposit a sheet on the platform and then withdrawn, the platform is turned over about its mid-point so that the sheet is turned over with it and allowed to fall on to the conveyor 35. The operative connection shown in Fig. 9 comprises a gear-wheel 90 on the shaft 75 meshing with a gear-segment 91 which is connected to a rod 92. The said rod 92 is normally held towards the right by a spring 93 but can be drawn to the left, to cause the platform 73 to turn over, by the engagement with a stop-collar 94 on the said rod of a forked downward extension 95 on the movable bars 5. This engagement takes place towards the end of the withdrawal movement of the said bars 5. After the sheet has fallen from the platform 73 and immediately upon the commencement of the advance movement of the bars 5, the said platform is returned to its normal position, ready to receive another sheet from the said bars 5, by the action of the spring 93.

In a further form of stacking means the platform is again composed of a series of bars 73 constituting an extension of the fixed bars of the conveyor in the normalizing chamber. Instead of the platform being pivoted at its middle it is pivoted at one end as indicated in dotted lines at 77 so that it is turned over about said end. For such an arrangement the chamber 21 will have to be larger than is illustrated in Figs. 4 and 6. Neither of the arrangements illustrated in Figs. 4, 5, and 6 can be employed in the treatment of trays of articles.

A further form of stacking means is illustrated in Figs. 7 and 10. A pair of members each has a number of arms 79 (four in the arrangement illustrated) and each arm carries supporting bars 41 to receive the sheets. The arms of each member extend from a shaft or hub 81. The shafts or hubs are opposite and parallel to each other and are rotatable to bring arms opposite to each other to constitute a platform. When the sheet is to be dropped on to the stack the members are rotated through 90° to move the arms downwards. This movement causes other arms to move opposite to each other to constitute another platform to receive another sheet and so on. The operating means in this case are essentially similar to those shown in Fig. 9, except that the rod 92 acts through a lever 96 with a forked pivotal head engaging a cam 97 which is formed on a sleeve 98 loose on a shaft 81. The sleeve 98 carries a pawl 99 adapted for engaging, in the direction of rotation of the arms 79, with a ratchet-wheel 100 fast on the shaft 81. The operation will be readily understood without further explanation.

The annealing chamber may have the roof or a part of it water cooled as shown at 83. 85 is a port for the introduction of cooled non-oxidizing gases to assist the cooling of the plates in a non-oxidizing atmosphere. Such gases will fill the annealing chamber 23 and the chambers 21 and 19 and may be removed by the port 87, cooled, dried and returned to the port 85.

The fixed and movable bars in the hottest part of the normalizing chamber 1 are of heat resisting metal or the bars may be of refractory material. In the hottest parts of the annealing chamber the fixed and movable bars are of refractory material supported on metal while in the cooler parts they are of plain unlined steel or iron castings.

In carrying out the normalizing and annealing treatment in apparatus as described above the two treatments are carried out in one furnace apparatus and the heat provided for the normalizing process is also made to serve for the annealing process whereby saving of fuel is effected. At the same time the apparatus and method according to the present invention provides more accurate and regular heat control, saving in handling labour and the use of annealing covers which have to be continually replaced is obviated.

The annealing process may include alternate heating and cooling operations. In some circumstances the receiving chamber may be heated.

The stacking of the sheets in a pile on the conveyor 35 assists in maintaining them at an even temperature for an extended period of time and also assists in preventing oxidation of the surfaces of the sheets. The annealing chamber 23 may thus be shorter than is usually necessary in an annealing furnace.

It will be understood that the stacking means may be operated by hand though it is preferable to arrange it to be operated automatically.

What I claim is:—

1. Furnace apparatus for the heat treatment of flat articles comprising a normalizing chamber, conveyor means therein to transmit the articles therethrough, a receiving chamber at the discharge end of said normalizing chamber, an annealing chamber communicating with the receiving chamber, conveyor means extending through the annealing chamber and stacking means in the receiving chamber to receive the articles from the first conveyor means and drop them one onto the other to form a pile upon the second conveyor means without relative transverse movement of one article in relation to and while in contact with another article.

2. Furnace apparatus for flat articles, comprising a heating chamber, a receiving chamber, a pre-cooling chamber connecting said heating chamber with said receiving chamber, an annealing chamber communicating with said receiving chamber, conveyor means for transmitting the articles through the heating and precooling chambers, means in the pre-cooling chamber for delivering cooling gas upon the articles, conveyor means in the annealing chamber and stacking means in the receiving chamber adapted to receive the articles from the first conveyor means and drop them one onto the other to form a pile upon the second conveyor means without relative transverse movement of one article in relation to and while in contact with another article.

3. Furnace apparatus for flat articles, comprising a heating chamber, a cooling chamber, a receiving chamber communicating between said heating and cooling chambers, article-conveying means in said heating chamber, a platform in said receiving chamber disposed for receiving the articles from the conveying means in said heating chamber, conveying means in the cooling chamber, and means for inverting said platform to drop the articles substantially vertically in a stack upon the last named conveying means.

4. In combination with furnace apparatus including treatment chambers and conveyors for transmitting flat articles therethrough, stacking means comprising a divided platform disposed for receiving articles from a first conveyor, pivots at their outer edges of the platform-parts and means to cause the platform-parts to turn downwardly about their pivots to allow the articles to drop between them and form a stack below them upon a second conveyor.

5. Furnace apparatus comprising treatment chambers, a reciprocating conveyor for feeding flat articles through a first such chamber, a conveyor in a second such chamber, a divided platform disposed for receiving the articles from the first conveyor, shafts upon which the platform parts are mounted at their outer edges, arms carried upon said shafts, electrically operated detents engageable with said arms for holding the platform parts in the raised receiving position an energizing circuit for said detents, an operative connection between the shafts and the first conveyor, whereby the platform parts are raised as said conveyor moves forward, a switch in the detent-energizing circuit, and an operative connection between said switch and the first conveyor whereby said detents are disengaged upon the rearward movement of said conveyor, so that the platform parts fall to deposit the articles in a stack upon the second conveyor, and are reengaged upon the forward movement of the first conveyor.

6. Furnace apparatus according to claim 5 wherein the operative connection between the shafts and the first conveyor comprises a pivoted arm engageable by a part of said conveyor as it moves forward.

7. In combination with furnace apparatus including treatment chambers and conveyors for transmitting flat articles therethrough, stacking means comprising a pair of parallel shafts, a plurality of co-acting arms extending from said shafts and means for rotating said shafts to bring successive pairs of arms together and in position to receive the articles from a first conveyor, and then to deposit said articles in a stack upon a second conveyor.

8. Furnace apparatus for flat articles comprising treatment chambers, a walking beam conveyor having fixed and movable bars in a first such chamber a conveyor in a second such chamber, and a stacking device disposed between the said conveyors and comprising a platform of supporting bars spaced to receive the movable bars of the first conveyor between them and means for turning down said platform to allow the articles to drop between them and form a stack below them upon the second conveyor.

9. Apparatus for the heat treatment of flat metal articles comprising a normalizing chamber, heating means for said chamber, conveyor means for passing the articles through said chamber, an annealing chamber, conveyor means for passing the articles through said annealing chamber, stacking means to receive the articles from the conveyor in the normalizing chamber and drop them one onto the other to form a pile on the conveyor means in the annealing chamber, without relative transverse movement of one article in relation to and while in contact with another article, and means for conserving heat from the normalizing chamber until the annealing chamber is reached.

10. Apparatus for the heat treatment of flat metal articles comprising a normalizing chamber having conveyor means for passing the articles through said chamber, alternate heating and cooling means for said chamber, an annealing chamber, conveyor means for passing the articles through said annealing chamber, stacking means to receive the articles from the conveyor in the normalizing chamber and drop them one onto the other to form a pile on the conveyor means in the annealing chamber, without relative transverse movement of one article in relation to and while in contact with another article, and means for conserving heat from the normalizing chamber until the annealing chamber is reached.

ARTHUR WILLIAM OGILVY-WEBB.